United States Patent [19]

Levy

[11] 4,428,724

[45] Jan. 31, 1984

[54] MICROGROOVED PROCESSING ROLL AND METHOD FOR HEAT TREATING SHEET FILM USING SAME

[75] Inventor: Stanley B. Levy, Wilmington, Del.

[73] Assignee: E. I. Du Pont de Nemours and Company, Wilmington, Del.

[21] Appl. No.: 306,734

[22] Filed: Sep. 29, 1981

[51] Int. Cl.³ .......................... B29C 25/00; B29D 7/20
[52] U.S. Cl. .................................. 425/446; 264/210.1;
264/216; 264/280; 264/345; 264/348; 264/556;
425/66; 425/224; 425/404; 425/445
[58] Field of Search ...................... 425/66, 224, 378 R,
425/223, 363, 445, 446, 404; 264/216, 284,
210.1, 345, 346, 348, 555, 556

[56] References Cited

U.S. PATENT DOCUMENTS

| | | |
|---|---|---|
| 1,123,388 | 1/1915 | Schaanning . |
| 3,048,895 | 8/1962 | Bottomley .............................. 18/57 |
| 3,056,164 | 10/1962 | Reichel et al. ........................... 18/15 |
| 3,175,026 | 3/1965 | James ................................ 425/378 X |
| 3,286,895 | 11/1966 | Poumakis ................................ 226/95 |
| 3,405,884 | 10/1968 | Patterson ................................ 242/76 |
| 3,520,959 | 7/1970 | Busby .............................. 264/216 X |
| 3,570,052 | 3/1971 | Reade ....................................... 18/1 |
| 3,635,631 | 1/1972 | Fields ............................... 425/224 X |
| 3,795,441 | 3/1974 | Hoffman et al. ..................... 355/3 R |
| 3,842,152 | 10/1974 | Witfield et al. ...................... 264/210 |
| 3,867,500 | 2/1975 | Traynor ............................... 264/216 |
| 4,029,249 | 6/1977 | Nagel et al. ........................... 226/95 |
| 4,079,114 | 3/1978 | Bonner .............................. 425/224 X |
| 4,134,951 | 1/1979 | Dow et al. ...................... 264/284 X |
| 4,144,008 | 3/1979 | Schwarz ................................ 425/66 |
| 4,148,851 | 4/1979 | Tani et al. ........................ 264/216 X |

FOREIGN PATENT DOCUMENTS

| | | | |
|---|---|---|---|
| 924073 | 4/1973 | Canada ................................ 18/169 |
| 4622768 | 11/1979 | Japan ........................................ 7/26 |
| 5389766 | 2/1980 | Japan ........................................ 17/4 |

OTHER PUBLICATIONS

U.S. Ser. No. 417,594, filed Nov. 20, 1973, by Whitfield.

*Primary Examiner*—Donald E. Czaja
*Assistant Examiner*—James C. Housel

[57] ABSTRACT

Sheets of organic thermoplastic polymeric film are contacted with processing rolls having a microgrooved surface to reduce the air layer therebetween, thereby aiding heat transfer between film and roll and consequently increasing processing speed.

22 Claims, 1 Drawing Figure

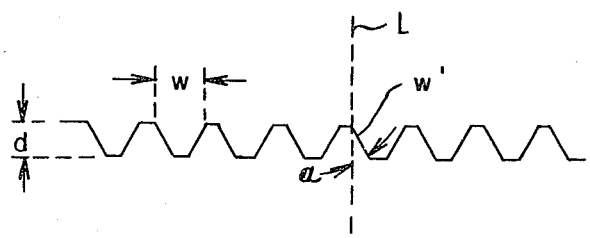

MICROGROOVED PROCESSING ROLL AND METHOD FOR HEAT TREATING SHEET FILM USING SAME

BACKGROUND OF THE INVENTION

The subject invention relates to an improved process and apparatus for heat transfer between a processing roll and sheets of organic thermoplastic crystallizable or crystalline polymeric film.

For years, numerous film manufacturing processes have been operating at relatively slow processing speeds because the rate determining step of these processes has been the heat transfer between a processing roll and the sheet film. If the processing speed is increased, an air layer forms between the film and the roll substantially reducing the heat transfer therebetween, resulting in sub-standard film properties. To overcome this speed deficiency, devices such as electrostatic pinners and vacuum chambers have been used to eliminate the air layer between roll and film.

SUMMARY OF THE INVENTION

The subject invention is a method for heat transfer between a processing roll and sheets of organic thermoplastic crystallizable or crystalline polymeric film at processing speeds up to four times that of conventional heat transfer processes. Also provided is an apparatus for carrying out the process.

More specifically, the subject invention is a process for high speed heat transfer between processing rolls and sheets of organic thermoplastic crystallizable or crystalline polymeric film comprising providing a processing roll having 70 to 150 circumferential grooves per centimeter on the surface of the roll, the top width of said grooves on the surface of the roll being 0.04 to 0.13 millimeter and the depth of said grooves being at least 0.02 millimeter such that the ratio of depth to width is greater than 0.25, maintaining the roll at a temperature different from that of said film and contacting said film with said roll for a time sufficient to bring the temperature of the film to processing temperature.

Also provided is an apparatus to carry out the process, an improvement over those of the past for high speed heat transfer between a processing roll and sheets of organic thermoplastic crystallizable or crystalline polymeric film of the type having a rotatably mounted processing roll, means for maintaining said roll at a temperature different from that of said film and means for contacting said film with said roll, the improvement which comprises 70 to 150 circumferential grooves per centimeter on the surface of the roll, the top width of said grooves on the surface of the roll being 0.04 to 0.13 millimeter and the depth of said grooves being at least 0.02 millimeter such that the ratio of depth to width is greater than 0.25.

BRIEF DESCRIPTION OF THE FIGURE

The FIGURE is a schematic representation of a magnified cross-section of the microgrooved surface of the processing roll of the subject invention.

DETAILED DESCRIPTION

Many thermoplastic and thermoset film manufacturing operations include processing rolls used to transfer heat between these rolls and the film, common examples including quench rolls, heat set rolls and heated or cooled stretch rolls. During high speed film processing, an air layer is trapped between the film and the roll resulting in a reduction of heat transfer therebetween. Further, this air layer reduces the friction between the roll and the film allowing undesirable transverse shrinkage, or neck-in, during operations requiring heating of the film to near melt temperatures.

In order to minimize the air layer trapped between the film and the processing roll while at the same time maximizing the heat transfer therebetween, a well defined microgrooved escape path for the air on the surface of the roll has been discovered which surprisingly does not result in objectionable embossing of the film surface. This microgrooving allows heretofore unobtainable high speed film processing.

A magnified portion of the processing roll useful in the practice of the subject invention is seen in the FIGURE. The subject invention provides for 70 to 150 circumferential grooves per centimeter on the surface of the heat set roll. Other groove patterns, e.g., a chevron pattern, as well as patterns utilizing greater than 150 grooves per centimeter, exhibit unacceptable air movement from under the film and hence the air layer between the film and the roll hampers heat transfer therebetween. Further, if less than about 60 to 70 grooves per centimeter are used, undesirable embossing of the film surface takes place.

To minimize this air layer and maximize heat transfer, the grooves must have a top width w of 0.04 to 0.13 millimeter and a depth d greater than 0.02 millimeter such that the ratio of depth to width is greater than 0.25. Wider grooves result in a loss of contact area between film and roll and hence an undesirable loss of heat transfer therebetween. Shallower grooves do not allow sufficient air movement to eliminate the air layer between film and roll. The grooves preferred to practice the subject invention have a width w of about 0.09 millimeter and a depth d of about 0.08 millimeter.

Ideally, the walls of the grooves are etched such that line L drawn perpendicular to the surface of the roll is parallel to or superimposed on wall w'. However, practically speaking, etching such a groove is difficult as the residue created by the etching process has no means to escape. Therefore, the grooves are etched with sloping walls to allow etching residue to slide up and out of the grooves. Consistent with the above mentioned depth and width requirements of the grooves, the grooves are preferably etched such that wall w' of the groove and line L drawn perpendicular to the surface of the roll to intersect wall w' form an acute angle alpha ($\alpha$) of less than 60 degrees.

The subject invention can be utilized in any film manufacturing process where a processing roll is used as a heat source or heat sink thereby transferring heat between film and roll. Where the manufacturing speed of the film is dependent upon this step of heat transfer, the processing speed can be increased up to four fold as seen in the Examples below.

In one embodiment of the subject invention, high speed heat setting of polyester film is carried out on a heat setting apparatus having a heat set roll with a grooved surface as defined above. The apparatus can also include means, such as nip rolls, for forcing the film onto the heat set roll along the line where the film contacts the heat set roll and along the line where the film leaves the heat set roll to assure intimate contact between the film and the tops of the grooves. The heat set roll is maintained at a heat setting temperature of between 170° and 205° C. and the film contacted with such a roll until the film reaches a processing temperature of 165° to 200° C., generally the contact time being 0.05 to 0.2 second.

In another embodiment of the subject invention, high speed casting of polyester film onto a quench roll is carried out using a quench roll with a grooved surface as defined above. The roll is maintained at 20° to 50° C. and molten polyester materials extruded onto the quench roll so that the polyester solidifies into film form.

In still another embodiment of the subject invention, high speed orientation of polyolefin or polyamide film is carried out utilizing stretch rolls i.e., a first slow roll and a second fast roll, both of which may have a grooved surface as defined above. Therefore, for orientation of polyamide film, the slow roll is maintained at a temperature between 120° and 190° C. and the film contacted with this roll for 0.2 to 0.3 second or until the film reaches a processing temperature of 115° to 185° C. For orientation of polyolefin film, the slow roll is maintained at a temperature between 100° and 140° C. and the film contacted with this roll for 0.2 to 0.4 seconds or until the film reaches a processing temperature of 95° to 135° C. to allow it to be oriented. Due to the soft nature of polyolefin film, however, it is preferred that there be 95 to 150 grooves per centimeter in the surface of the slow stretch roll. As is well known in the art, these slow rolls are followed in the orientation process by faster turning rolls to effectuate the machine direction stretching of the film. This fast roll can also be utilized as a heat set roll if desired as illustrated in Example III.

The subject invention can be utilized in any process where minimizing the air layer between a flat sheet web and a processing roll is important both to the maximization of heat transfer therebetween and transverse shrinkage restraint and should not be limited to the processes described in the Examples that follow.

EXAMPLE I

Polyester terephthalate film having a thickness of 0.038 millimeter was heat set at 366 meters per minute on a 20 centimeter heat set roll having 70 grooves per centimeter on the surface of the roll, the top width of said grooves being 0.096 millimeter and the depth of said grooves being 0.087 millimeter. The roll was maintained at about 190° C. to bring the film to a processing temperature of about 185° C., the contact time between the film and the roll being about 0.05 seconds. Runs were made with both a single nip roll at the line where the film comes into contact with the heat set roll and dual nip rolls, one at the line where the film comes into contact with the heat set roll, the other at the line where the film leaves the heat set roll. The resulting heat set film showed a transverse width loss of 140 millimeters with the single nip roll and 114 millimeters with the dual nip rolls.

COMPARATIVE EXAMPLE I

The procedure of Example I was repeated using a conventional smooth heat set roll. Due to the air layer formed between the film and the roll at such a high processing speed, the film was not properly heat set and the film showed a transverse width loss of 276 millimeters with the single nip roll and 216 millimeters with the dual nip rolls.

EXAMPLE II

A polyolefin film consisting of 97.5% propylene and 2.5% ethylene and having a thickness of 0.025 millimeter was heated for machine direction stretching at 61.0 meters per minute on a 20 centimeter heat processing roll having 118 grooves per centimeter on the surface of the roll, the top width of said grooves being 0.02 millimeter and the depth of said grooves being 0.025 millimeter. The roll was maintained at about 135° C. to bring the film to a processing temperature of 133° C., the contact time between the film and the roll being about 0.10 second. The film was then run over a cool processing roll at 110 meters per minute to effectuate stretching of the film between the two processing rolls. This cool roll was maintained at 38° C. to bring the film to a temperature of 39° C. to retain the effect of the machine direction stretch. The contact time between the film and this roll being about 0.17 second. The cool roll had 80 grooves per centimeter on the surface of the roll, the top width of the grooves being 0.10 millimeter and the depth of the grooves being 0.025 millimeter. The edges of the resulting film laid flat passing over the first roll and did not display puckering, i.e., did not evidence air trapped under the film, as it passed over the second roll.

COMPARATIVE EXAMPLE II

The procedure of Example II was repeated with two smooth rolls. The edges of the film curled up as the film passed over the first roll, tending to cause film breaks, and puckering was evidenced as the film passed over the second roll.

EXAMPLE III

Polyamide film having a thickness of 0.038 millimeter was heated for machine direction stretching as 122 meters per minute on a 20 centimeter heat processing roll prior to stretching. This slow roll had 72 grooves per centimeter on its surface, the top width of the grooves being 0.096 millimeter and the depth of the grooves being 0.087 millimeter. The roll was maintained at about 171° C. to bring the film to a processing temperature of about 170° C., the contact time being about 0.15 seconds. The film was subsequently passed over a fast heat set roll running at about 366 meters per minute with a groove pattern identical to that of the slow roll. The temperature of the fast roll was maintained at about 205° C. to bring the film to a heat setting temperature of about 200° C., the contact time being about 0.05 seconds. The processing speed of 366 meters per minute was four times faster than the orientation process using smooth heat processing rolls.

EXAMPLE IV

A molten polyester terephthalate web was extruded onto a quench roll which was microgrooved over half of its surface and smooth over the other half of its surface. The grooves were spaced at 80 grooves per centimeter, the top width of the grooves were 0.10 millimeter and the depth of the grooves were 0.025 millimeter. The resulting film portion which was quenched on the microgrooved portion of the quench roll did not show signs of detrimental embossing and displayed good gauge uniformity. The resulting film portion which was quenched on the smooth portion of the quench roll evidenced gauge nonuniformities and surface irregularities due to air entrapped between the molten web and the quench roll.

I claim:

1. An improved apparatus for heat transfer between a processing roll and sheets of organic thermoplastic crystallizable or crystalline polymeric film comprising a rotatably mounted processing roll, means for maintaining said roll at a temperature different from that of said film and means for contacting said film with said roll, the improvement which comprises 70 to 150 circumferential grooves per centimeter in the surface of the roll, the top width of said grooves on the surface of the roll being 0.04 to 0.13 millimeter and the depth of said grooves being at least 0.02 millimeter such that the ratio of depth to width is greater than 0.25.

2. The apparatus of claim 1 wherein an acute angle between the wall of a groove and a line drawn perpendicular to the surface of the roll intersecting said wall is less than 60 degrees.

3. The apparatus of claim 1 wherein means is included for forcing the film onto the roll along the line where the film contacts the roll and along the line where the film leaves the roll.

4. An improved apparatus for heat setting polyester film comprising a rotatably mounted heat set roll, means for maintaining said roll at 170° to 205° C. and means for contacting said film with said roll, the improvement which comprises 70 to 150 circumferential grooves per centimeter in the surface of the heat set roll, the top width of said grooves on the surface of the roll being 0.04 to 0.13 millimeter and the depth of said grooves being at least 0.02 millimeter such that the ratio of depth to width is greater than 0.25.

5. The apparatus of claim 4 wherein an acute angle between the wall of a groove and a line drawn perpendicular to the surface of the roll intersecting said wall is less than 60 degrees.

6. The apparatus of claim 4 wherein means is included for forcing the film onto the roll along the line where the film contacts the roll and along the line where the film leaves the roll.

7. An improved apparatus for quenching molten polyester film comprising an extruder die extruding the polymer in web form onto a rotatably mounted quench roll and means for maintaining said roll at 20° to 50° C., the improvement which comprises 70 to 150 circumferential grooves per centimeter on the surface of the quench roll, the top width of said grooves on the surface of the roll being 0.04 to 0.13 millimeter and the depth of said grooves being at least 0.02 millimeters such that the ratio of depth to width is greater than 0.25.

8. The apparatus of claim 7 wherein an acute angle between the wall of a groove and a line drawn perpendicular to the surface of the roll intersecting said wall is less than 60 degrees.

9. The apparatus of claim 7 wherein means is included for forcing the film onto the roll along the line where the film contacts the roll and along the line where the film leaves the roll.

10. An improved apparatus for orientation of polyolefin film comprising a rotatably mounted heating roll followed by a stretching zone, means for maintaining said roll at 100° to 140° C. and means for contacting said film with said roll, the improvement which comprises 95 to 150 circumferential grooves per centimeter on the surface of the heating roll, the top width of said grooves on the surface of the roll being 0.04 to 0.13 millimeter and the depth of said grooves being at least 0.02 millimeter such that the ratio of depth to width is greater than 0.25.

11. The apparatus of claim 10 wherein an acute angle between the wall of a groove and a line drawn perpendicular to the surface of the roll intersecting said wall is less than 60 degrees.

12. The apparatus of claim 10 wherein means is included for forcing the film onto the roll along the line where the film contacts the roll and along the line where the film leaves the roll.

13. An improved apparatus for orientation of polyamide film comprising a rotatably mounted heating roll followed by a stretching zone, means for maintaining said roll at 120° to 190° C. and means for contacting said film with said roll, the improvement which comprises 70 to 150 circumferential grooves per centimeter in the surface of the heating roll, the top width of said grooves on the surface of the roll being 0.04 to 0.13 millimeter and the depth of said grooves being at least 0.02 millimeter such that the ratio of depth to width is greater than 0.25.

14. The apparatus of claim 13 wherein an acute angle between the wall of a groove and a line drawn perpendicular to the surface of the roll intersecting said wall is less than 60 degrees.

15. The apparatus of claim 13 wherein means is included for forcing the film onto the roll along the line where the film contacts the roll and along the line where the film leaves the roll.

16. A process for heat transfer between a processing roll and sheets of organic thermoplastic crystallizable or crystalline polymeric film comprising:
(i) providing a processing roll having 70 to 150 circumferential grooves per centimeter in the surface of the roll, the top width of said grooves on the surface of the roll being 0.04 to 0.13 millimeters and the depth of said grooves being at least 0.02 millimeters such that the ratio of depth to width is greater than 0.25;
(ii) maintaining the roll at a temperature different from that of said film
(iii) bringing the film to processing temperature by contacting of the film with the roll.

17. The process of claim 16 further comprising forcing the film onto the roll along the line where the film contacts the roll and along the line where the film leaves the roll.

18. The process of claim 16 wherein the film is a polyester film, the temperature of the roll of step (ii) is between 100° and 140° C. and the processing temperature of step (iii) is from 95° to 135° C.

19. The process of claim 16 wherein the film is a polyester film, the temperature of the roll of step (ii) is between 170° and 205° C. and the processing temperature of step (iii) is from 165° to 200° C.

20. The process of claim 16 wherein the film is a polyolefin film, there is provided 95 to 150 circumferential grooves per centimeter on the surface of the roll, the temperature of the roll of step (ii) is between 100° and 140° C. and the processing temperature of step (iii) is from 95° to 135° C.

21. The process of claim 16 wherein the film is a polyamide film, the temperature of the roll of step (ii) is between 120° and 190° C. and the processing temperature of step (iii) is from 115° to 185° C.

22. The process of claim 16 wherein the film is a polyimide film, the temperature of the roll of step (ii) is between 200° and 210° C. and the processing temperature of step (iii) is from 190° to 210° C.

* * * * *